Aug. 11, 1959  S. SALEM  2,898,664
METHOD FOR TREATING FIBER CORDS
Filed May 13, 1955
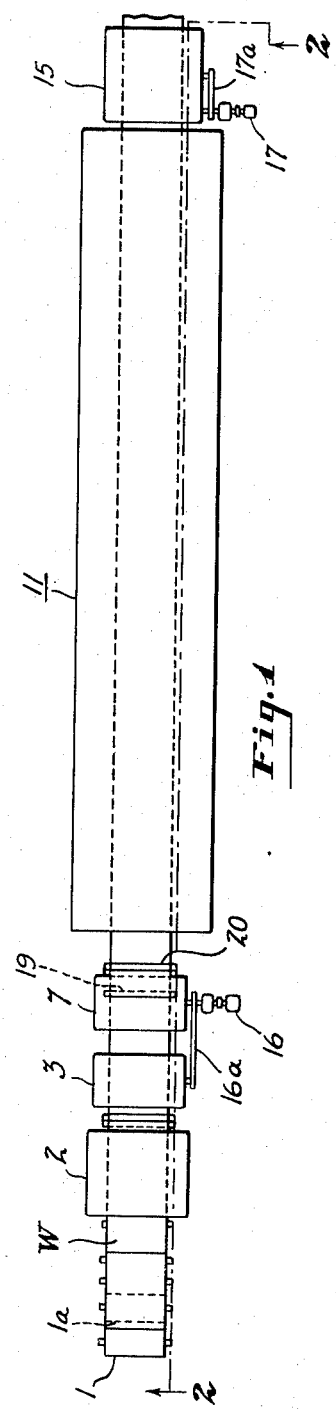
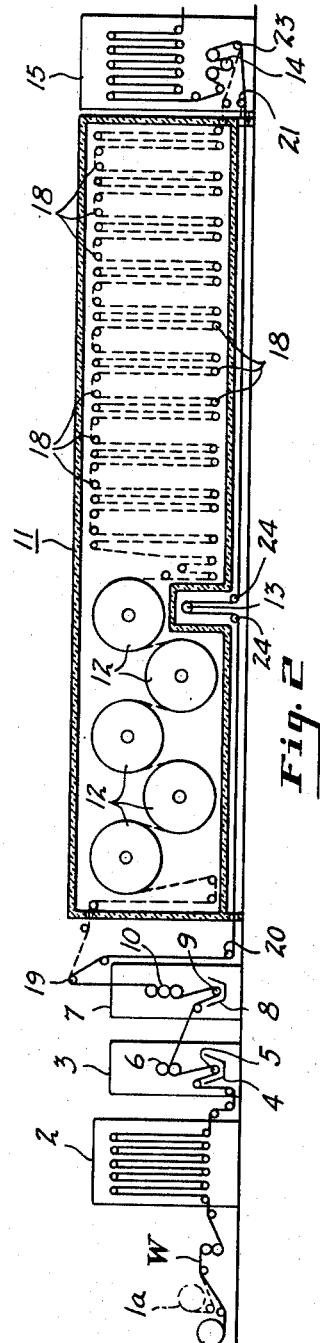
INVENTOR
Samuel Salem
BY McCoy, Greene & TeGrotenhuis
ATTORNEYS

2,898,664

METHOD FOR TREATING FIBER CORDS

Samuel Salem, Akron, Ohio, assignor to The General Tire and Rubber Company, Akron, Ohio, a corporation of Ohio Application May 13, 1955, Serial No. 508,065

1 Claim. (Cl. 28—76)

The present invention relates to the treatment of cords and more particularly to an improved method for treating fiber cords arranged in a fabric web prior to their use in rubber tires and other reinforced rubber articles.

This application is a continuation-in-part of the copending application of Salem et al., Serial No. 442,364, filed July 9, 1954.

Fiber cords of nylon, viscose rayon, Dacron or the like which are to be employed in the making of pneumatic rubber tires and other fabric-reinforced rubber articles are normally coated or impregnated with a suitable adhesive so that they will adhere satisfactorily to natural or synthetic rubber and are usually heated and cooled under accurate tension, temperature and elongation conditions to obtain properties desirable in a fabric-reinforced rubber article. However, it is undesirable to saturate the cords with an excessive amount of adhesive not only because of the cost of the adhesive but also because such saturation impairs the physical properties of the cords and makes them less suitable for use in the rubber article. A cord saturated with latex adhesive, for example, has greater stiffness and less resilience than a cord having a thin coating of said adhesive and is therefore less desirable for a tire or similar article.

The present invention provides a simple method to reduce the pickup of adhesive and to prevent saturation of the cords with adhesive whereby a thin uniform coating of adhesive may be applied to the outer surface of a tire cord or the like without unduly reducing the flexibility of the cord. According to this method the fiber cords are wetted with water or other suitable harmless liquid, the excess liquid is removed in any suitable manner, the wet cords are then dipped in a latex adhesive or other suitable rubber to fabric adhesive, the excess liquid or solid material from the adhesive dip is removed in a suitable manner, and the cords are dried. During or after drying the cords may be subjected to a hot-stretching process such as disclosed in said copending application Serial No. 442,364 or treated in any other suitable manner prior to being used in a fabric-reinforced article.

By thoroughly wetting the cords before they are dipped in the adhesive, the penetration of adhesive into the cords and the amount of adhesive picked up by the cords is reduced substantially. Where substantially pure water is used in the predip, such water may be evaporated in the heating zones of a drying oven and will leave substantially no residue in the cords. As a result, the latex adhesive applied to such cords does not penetrate into the central portion of the cords so as to stiffen the cords unduly but adheres to the outer surface of the cords. It has been found that cords made by such method have increased flexibility and greater flex life. Furthermore, the novel dipping process effects a substantial saving of latex adhesive by reducing the penetration of the latex into the cord. Where previously it has been customary for nylon tire cords to increase in weight up to about seven or eight percent after being dipped in latex adhesive and dried according to former methods, it is found that satisfactory adhesion of nylon to rubber can be obtained where the cords increase in weight only about two percent due to the latex adhesive. By the use of a water dip according to the method of the present invention, it is possible to reduce the increase in weight due to the pickup of latex to about two or three percent, the water picked up by the cords being evaporated in the drying oven.

Another method of reducing the penetration of the adhesive into the cords is to avoid the use of squeeze rolls or to employ higher tensions during dipping, but neither of these methods is as effective as the method described above. Although satisfactory results are obtained by employing just sufficient tension during dipping to prevent substantial shrinkage of the cords, it is preferable to employ a slightly greater tension to reduce the penetration. Where nylon cords are treated, satisfactory results are obtained when the stretch during dipping is between about $-2\%$ and $+2\%$, but it is usually preferable to stretch the cords about 1 or 2% during dipping to reduce the penetration of the adhesive.

The predipping method described above for reducing the penetration of adhesive may also be employed where a fiber cord fabric web having a soluble weft thread is to be treated with a rubber to fabric adhesive. When such fabric is treated according to such method, the weft threads may be dissolved during wetting of the warp cords with the aqueous liquid and before said cords are treated with the latex adhesive to provide a weftless fabric.

An object of the invention is to provide a simple and inexpensive method for reducing penetration of latex adhesive into the central portion of synthetic fiber cords and for reducing the amount of latex adhesive necessary for the proper treatment of such cords.

A further object of the invention is to provide high quality tire cords which adhere strongly to rubber and which have high flexibility.

A still further object of the invention is to provide a method which disintegrates the weft threads of a woven tire cord fabric and reduces the penetration of latex adhesive into the warp cords.

Other objects, uses and advantages of the present invention will become apparent from the following description and from the drawings in which:

Figure 1 is a schematic top plan view on a reduced scale of a nylon-rayon process oven and an apparatus for dipping the fabric in water and latex prior to hot stretching of the warp cords; and Figure 2 is a schematic side elevational view, partly in section, taken substantially on the line indicated at 2—2 of Fig. 1.

Referring more particularly to the drawings in which like parts are identified by the same numerals throughout the several views, Figs. 1 and 2 show in schematic form a process oven for treating viscose rayon, nylon, Dacron, or similar synthetic fiber cords, said oven being the same as the oven shown in Figs. 1 to 8 of said copending application Serial No. 442,364. Such oven is adapted to treat nylon or rayon cords by applying a latex adhesive or other suitable adhesive thereto, heating the cords to dry the same, and heating and cooling the cords under tension to reorganize the molecular structure of the cords and set the same. Separate portions of the oven are used to heat the nylon and the viscose rayon cords, but much of the mechanism that is utilized when nylon is being treated may be used when rayon is being treated and vice versa. The path of the nylon cords through the oven is shown in solid lines in Figs. 1 and 2 while the path of the rayon cords is shown in dotted lines.

Before cords of nylon, rayon, Dacron or similar synthetic fibers are treated in the oven of Figs. 1 and 2, they are woven to form a fabric web of uniform width that may be wound on suitable supply rolls. The warp cords usually have a length of several hundred feet and are usually held in mutually parallel relationship in the fabric web by transverse woof or tie threads forming the weft. These threads usually have a length several times the width of the web and are preferably relatively weak with respect to the long parallel cords forming the warp so as to provide a pick-weave or weak-weft fabric suitable for the manufacture of rubber tire carcasses and similar reinforced rubber articles. The weft threads may be made of cotton or various other materials having sufficient strength to hold the warp cords in parallel relation and may be made of water-soluble materials such as polyvinyl alcohol or the like.

The nylon-rayon process oven shown in the drawings is designed for treating cord fabric webs that are to be used in building rubber tires or like rubber articles. In order to obtain satisfactory adhesion between the nylon or the viscose rayon fabric and the rubber, it has been found necessary to apply an adhesive to the surface of the fabric. Various fabric to rubber adhesives are available which give the desired degree of adhesive to synthetic fibers, such as nylon, rayon, Dacron, or the like, while permitting retention of the flexibility of the cords that is so vital to the life of such products as pneumatic tires, fabric-reinforced belting for conveyors and mechanical drives, and the like. For example, a latex adhesive containing partially condensed resorcinol formaldehyde might be used or a terpolymer adhesive containing 2-vinyl pyridine.

It has been found that copolymers of various conjugated diolefinic compounds having up to eight carbon atoms with 2-vinyl pyridine with or without additional mono-olefinic compound such as styrene, isopropenyl ketone, etc. have excellent adhesive properties for joining natural and some synthetic fibers to rubber. When combined with resorcinol and formaldehyde, their adhesion to nylon is also very good. Diolefinic compounds suitable for this purpose include the following monomers: butadiene, dimethyl-butadiene, chloroprene, and isoprene. Such adhesives suitable for the present invention are described in the Mighton Patent No. 2,561,215 and Mallory et al. Patent No. 2,615,826.

It has also been found that a practical and inexpensive latex adhesive may be provided by substituting styrene for part of the 2-vinyl pyridine, the preferable proportion of styrene to 2-vinyl pyridine, from the performance standpoint, being in the vicinity of 3:2. However, very good results may be obtained with a ratio of styrene to 2-vinyl pyridine as low as 1:4 or as high as 2:1. The highest possible proportion of styrene may be most desirable from the cost standpoint in view of the undesirably high cost of 2-vinyl pyridine. Where economy is the controlling consideration, the lowest amount of 2-vinyl pyridine which will give the required bond strength will be selected.

While it appears that the quantities and proportions of monomers employed are governed by no clearly defined limits, the practical operative ranges appear to be about as follows:

5% to 30% 2-vinyl pyridine
5% to 30% styrene
10% to 35% 2-vinyl pyridine plus styrene
Balance polymerizable diolefine The preferred ranges are substantially as follows:

5% to 15% 2-vinyl pyridine
10% to 20% styrene
15% to 30% 2-vinyl pyridine plus styrene
Balance polymerizable diolefine The polymerizable diolefine may be butadiene, but any polymerizable conjugated diolefine having up to 8 carbon atoms may be used in the molecule in place of butadiene as the major constituent of the adhesive. For example, mixtures of two or more of such diolefines or other conjugated diolefinic compounds, such as isoprene, chloroprene, and 1-cyano-butadiene-1,3 may also be used, alone or in admixture, with the above diolefines when desired to provide adhesives especially suited for bonding fibers to certain synthetic rubber compositions.

Tests have shown that a latex adhesive of the type described above provides strong adherence between the fabric and the rubber and also high resistance to deterioration of the bond with flexing of the structure. Therefore, in order to increase the fatigue resistance of a pneumatic tire and the flex-like of the tire carcass, it is preferable to employ a latex adhesive such as "Gen-Tac" when treating tire cords according to the present invention.

"Gen-Tac" is a latex adhesive developed by The General Tire & Rubber Company of Akron, Ohio, and essentially comprises an aqueous dispersion of the copolymer of a mixture of a conjugated diolefinic compound having up to seven carbon atoms, 2-vinyl pyridine and styrene, the 2-vinyl pyridine constituting from about 5 to 30 percent of the mixture, the 2-vinyl pyridine and styrene together constituting from about 10 to 35 percent of said mixture, and the diolefinic compound constituting the balance of the mixture.

It has been found that a vinyl pyridine latex containing about 17 percent resorcinol formaldehyde resin solution and about 83 percent pyridine latex also provides an excellent rubber to fabric adhesive suitable for use in the method of the present invention.

A dry nylon fabric web may be passed through a dip tank containing "Gen-Tac" or other suitable adhesive in aqueous dispersion, heated in the oven while under tension to dry the web and heat the same, and cooled before tension is released so as to prevent shrinking. However, the dipping of dry nylon cords in the adhesive results in substantial absorption of the adhesive. The resulting cords leaving the oven tend to be relatively stiff even where an excellent adhesive such as "Gen-Tac" is used because of the adhesive that penetrates the cord.

It has been discovered that satisfactory adhesion of rubber to synthetic fiber cords can be obtained even when the adhesive occurs only near the surface of the cords and does not penetrate appreciably into the cords.

The present invention provides a method by which the penetration of the latex adhesive into the central portion of synthetic fiber cords is prevented. The cords, before being dipped in the aqueous latex adhesive dispersion are moistened with an aqueous liquid, such as water, which evaporates at temperatures below 300° F. without leaving any residue and which is compatible with and does not react with the latex adhesive. Such liquid upon evaporation may leave less than 0.5 percent residue. After dipping the excess liquid is removed by the use of scrapers, squeeze rolls, beater bars, air jets, or in any other suitable way, and the wet cords are then dipped in or treated with "Gen-Tac" or any other suitable rubber to fabric adhesive. Thereafter, the excess liquid and solid material is removed and the cords are heated and cooled usually while under some tension to dry the cords and to set the adhesive contained in the outer portion of each cord. The resulting cords are very flexible, are exceptionally well suited for tire carcasses, and adhere to rubber substantially as well as cords that are not pre-dipped in water. Deterioration of the bond due to flexing is reduced since the coating of latex adhesive on the cords is relatively thin. The weight of solid material applied to the fabric is usually less than four percent of the dry weight fabric.

The present invention of treating tire cords is particularly advantageous since it reduces the amount of relatively expensive latex adhesive needed to treat a given amount of fabric web. Where dry cords are dipped in "Gen-Tac" adhesive and dried, they may increase about 6 to 8 percent in weight due to the absorption of the adhesive. Where cords are wetted with water before being dipped in the latex adhesive and dried, they may increase in weight about 2 to 4 percent due to the pick-up of adhesive. It has been found that a two percent pick-up of latex adhesive is usually sufficient to provide satisfactory adhesion of nylon cords to rubber in a tire carcass.

As shown in Figs. 1 and 2, a fabric web W is fed from a supply roll 1 through a conventional festoon accumulator 2 to a dipping apparatus 3, spaced horizontal cylindrical rolls being provided to carry the web unwound from the supply roll. The dipping apparatus includes a first dip tank or trough 4 that is adapted to hold water or other vaporizable liquid that leaves no residue upon evaporation or any other suitable dipping solution, a submerged roller 5 in the tank 4, and a pair of parallel squeeze rolls 6 above the roll 5 for removing excess liquid from the web. The web leaving the accumulator 2 is guided by the rollers through the liquid contained in the dip tank 4 and between the rolls 6 to a second dipping apparatus 7. The web is then guided into a second dip tank or trough 8, similar to the tank 4, that contains "Gen-Tac" or other suitable latex adhesive in aqueous dispersion or other suitable adhesive. The apparatus 7 includes a submerged roller 9 which, like the roller 5, guides the web through the dipping solution in the dip tank and includes squeeze rolls 10 above the roller 9 that remove excess moisture and dip solids from the web. The squeeze rolls 6 and 10 are driven at the same peripheral speeds by suitable driving mechanism including a saturator motor 16 and a belt drive 16a whereby the fabric web W is unwound from the supply roll and rapidly pulled over the parallel rollers into the dip tanks. The web upon leaving the squeeze rolls 10 passes over a freely rotatable guide roller 19 located above the squeeze rolls and above the heating zones of the oven 11. The tension on the fabric web as it passes through the dip tanks may be only sufficient to prevent shrinkage and may be as low as ¼ to ½ pound per cord where 840/2 denier nylon cord is being treated. However, it is preferable to employ a higher tension during dipping which may be about 1 to 1½ pounds per cord where 840/2 denier nylon cord is treated or sufficient to stretch the cords about 1 or 2 percent.

Where viscose rayon is being treated, the web from the supply roll 1a (shown in dot-dash lines in Fig. 2) passes over the parallel guide rollers and through the festoon accumulator, the dip tanks, and the squeeze rolls to the upper guide roller 19. After passing over the roller 19, the rayon fabric web is guided by suitably located horizontal cylindrical rollers through an upper portion of the nylon-rayon process oven 11 where the web is heated by hot combustion gases directed to the upper portion of the oven from combustion chambers or the like. The rayon fabric web 15 is shown in dotted lines in Fig. 2. It will be understood that the roll ends may be spliced together to form a web of continuous length and that the splice will be able to withstand the tension applied to the web during stretching thereof.

Where nylon is being treated, the supply of combustion gases to the upper portion of the oven 11 is shut off and hot combustion gases are directed to heating zones located in the lower portion of the nylon-rayon process oven. The nylon fabric web from the supply roll 1 is guided through the accumulator, the dip tanks and the squeeze rolls by the parallel guide rollers and is directed over the upper roller 19 and under a lower cylindrical guide roller 20 at one end of the oven 11 to the first nylon heating zone of the oven. The web W is then heated while being stretched substantially and is cooled before the tension is released in the oven and passes to another horizontal cylindrical guide roller 21 located at the opposite end of the oven.

After passing beneath and engaging the horizontal guide roller 21, the fabric web engages another horizontal cylindrical guide roller 23 at a higher elevation than the roller 21. The web is guided by the roller 23 to pull rolls 14 which comprise three parallel cylindrical rollers arranged to drive the web and to apply a substantial tension thereto. These three rollers may be geared together and driven at the same peripheral speeds. However, as herein shown, the pull rolls comprise two idler rolls having their axes in the same horizontal plane and a drive roll in the bight of the idler rolls and below said plane. In order to prevent slippage of the web on the pull rolls 14 or the squeeze rolls 6 and 10, these rolls are preferably covered with rubber or the like. The pull rolls 14 are driven at any desired speed by a suitable driving mechanism including a pull rolls motor 17 and a suitable belt drive 17a.

The pull rolls motor 17 is adapted to be operated at a speed with respect to the saturator motor 16 such that the peripheral speed of the pull rolls 14 is substantially greater than the peripheral speed of the squeeze rolls 10 whereby the fabric web is under tension and is stretched a substantial amount as it passes from the squeeze rolls through the oven to the pull rolls. In some cases the fabric web may be subjected to a tension of more than 10,000 pounds and stretched up to about 20% as it passes from driving roll 29 to driving roll 25, but the tension preferably does not exceed 10 pounds per cord where the oven is designed to treat 840/2 denier nylon cord.

The end of the fabric web is spliced to the web of new supply rolls so that an endless supply of fabric is available, such splices being able to withstand tensions well over 10,000 pounds.

The nylon fabric web leaving the pull rolls 14 is guided by horizontal cylindrical rollers through a conventional festoon accumulator 15 to a place of storage or to other rubber machinery (not shown) where the fabric is used to reinforce tire carcasses and similar rubber articles. Where viscose rayon is being treated, the rayon fabric web is also guided by the roller 23 through the pull rolls and the accumulator to a point of storage or use. The festoon accumulators 2 and 15 permit some variation in the rate of supply of the nylon or rayon fabric to and the rate of delivery of the fabric from the drying oven without requiring a change in the speed of the fabric through the oven. However, means must be provided to slow down the motors 16 and 17 and the rate of fabric flow through the oven when the amount of fabric in accumulator 2 is reduced or the amount in accumulator 15 is increased beyond a predetermined amount or when the oven is shut down.

The tension in the fabric may be controlled solely by regulating the speed of the pull rolls motor 17 with respect to the saturator motor 16 so that the pull rolls operate a predetermined percent faster than the squeeze rolls. However, it is preferable to apply a predetermined tension to the web W by means including a synchronizing dancer roll 13 and a pair of idler rolls 24, Fluid motor means including a piston and cylinder unit may be provided for biasing the dancer roll 13 in an upward direction and for applying a predetermined force thereto.

Means may be provided for supplying fluid at a predetermined constant pressure to the fluid piston carrying the dancer roll so that any desired force may be applied to the dancer roll and the fabric supported thereon. Since this force must be at least 20,000 pounds to apply a tension of 10,000 pounds to the fabric web, the pressure means is preferably a high pressure hydraulic ram or the like, although a compressed air method of tension application would also be satisfactory.

A predetermined tension may be applied to the web W by applying a predetermined force to the dancer roll 13 tending to move it upwardly, and by increasing or decreasing the speed of the pull rolls motor 17 with respect to the saturator motor 16 so that the fabric web applies an equal but opposite force, tending to move the dancer roll downwardly. A predetermined tension on the fabric web may therefore be maintained at any speed of the web by increasing the speed of the pull rolls motor with respect to the saturator motor when the dancer roll moves upwardly and vice versa. A predetermined tension may be obtained by providing the pull rolls motor with a speed control which increases and decreases the speed of the motor in response to the vertical position of the dancer roll, for example as in the electrical system disclosed in said copending application Serial No. 442,364 wherein a rheostat is controlled in accordance with the vertical position of the dancer roll.

The nylon-rayon oven shown in Figs. 1 and 2 of the drawings is adapted to treat nylon, rayon, Dacron, Perlon, or similar synthetic fiber cords. When a viscose fabric web is treated, it is guided by parallel cylindrical rollers through the upper portion of the oven where it passes over a plurality of large drums 12 in the front part of the oven and two parallel rows of guide rollers 18.

As an illustrative example, the oven shown herein is adapted to treat a conventional weak-weft fabric web having a normal width of about 60 inches and containing about 1800 or 1900 strong 840/2 denier polyhexamethylene adipamide cords. Sufficient pressure may be applied to the piston of the hydraulic unit connected to the dancer roll so that a predetermined tenson of from about 5 to 5½ pounds is applied to each of the nylon cords of such web. This will stretch the fabric web during heating thereof in the oven about 15% or so.

The methods and apparatuses of the present invention are particularly well suited for the treatment of synthetic fibers such as viscose rayon, nylon, and Dacron. Dacron is an oriented fiber of the polyester formed from ethylene glycol and terephthalic acid (polyethylene terephthalate fiber oriented along the fiber axis). Nylon is usually considered to be an oriented fiber of long-chain linear polymeric amides, such as hexamethylene diamine and adipic acid (polyhexamethylene adipamide or Type 66 nylon), but also can be considered as an oriented fiber of polycapryl lactam which is commonly called Perlon or Type 6 nylon. The term "nylon" may therefore be construed to include both hexamethylene adipamide and polycapryl lactam whenever employed herein.

The oven shown herein is particularly constructed for the treatment of Type 66 nylon tire cords, but it will be understood that an oven of this type can be used to perform other methods and to perform various methods on Type 6 nylon, Dacron, and many other different types of fiber cords and on cords of various sizes or denier. Cotton fabric, for example, might be dipped, dried and hot-stretched in the oven of the present invention but in such a case the cords might stretch only about 0.5 percent during heating.

Where Dacron is being treated the elimination of squeeze rolls having high nip pressure is found to substantially increase the flexibility and fatigue life of the cord, the same results being obtained with nylon but to a lesser degree. It has been discovered that squeeze rolls have the effect of increasing the penetration of latex adhesive into the cord and of damaging the cords when the nip pressure is high. Therefore, the penetration of adhesive may be reduced not only by predipping the cords in water before the application of adhesive but also by eliminating the squeeze rolls, and providing other means of removing the excess dip.

The effective removal of excess dipping solution before drying of the cords is necessary to obtain tire cord fabric of highest quality. Effective removal may be obtained, without the use of squeeze rolls by employing other suitable apparatus, such as high pressure air jets, scrapers, or beater bars as disclosed in said copending application Serial No. 442,364.

The first dip tank 4 may contain an aqueous liquid which leaves no purposeful residue or pure water which leaves less than 0.5 percent (by weight) residue when evaporated, and the second dip tank 8 may contain any suitable latex adhesive in aqueous dispersion. The apparatus shown in Figs. 1 and 2 performs the method of the present invention by applying the aqueous liquid from the dip tank 4 to the warp cords before the application of the latex adhesive from the dip tank 8 so as to thoroughly wet the cords and prevent excessive permeation of the cords by the latex adhesive. Each of the cords emerging from the oven 11 has a substantially uniform coating of latex adhesive which penetrates only a short distance into the cord. The coating is substantially uniform throughout the length and circumference of the cord and usually has a weight that is about two to four percent of the weight of the cord, superior results being obtained where the weight of the coating is only about two to three percent of the weight of the cord.

Where the liquid in the dip tank 4 is of a type which evaporates without leaving a purposeful residue, the central portion of each cord leaving the oven 11 may contain less than 0.5 percent purposeful residue. Where the dip tank 4 contains pure water which upon evaporation leaves less than 0.5 percent residue, the central portion of each cord radially inwardly of the latex adhesive coating after the cord leaves the oven will contain substantially less than 0.5 percent residue and may be substantially free of residue from the dip tanks, the latex adhesive occurring only near the surface of the cord. Since the latex adhesive does not penetrate deeply into the cords, the cords are very flexible. After the cords are calendered, employed in making a tire casing, and bonded to the rubber of the tire by vulcanization, they adhere strongly to the rubber and provide cord reinforcement of the highest quality. Due to their excellent pliability or flexibility, the cords have superior resistance to compression-extension fatigue and provide a tire with an exceptionally long life. The thin coating of latex adhesive insures an excellent bond between the cords and the rubber.

The pretreating of the warp cords of a tire cord fabric with an aqueous liquid prior to the application of a latex adhesive according to the present invention provides cords of the highest quality. It will be understood that this method applies both to conventional weak-weft tire cord fabric and conventional weftless tire cord fabric. The fabric wound on the supply rolls 1 and 1a of Figs. 1 and 2 must, of course, be woven with weft threads to hold the warp cords of nylon, rayon, Dacron or the like in parallel relation. Additional apparatus including spools, creels or the like any be provided where weftless fabric is to be treated. However, the amount of apparatus required may be minimized by providing the fabric with water-soluble weft threads which may be dissolved when the warp cords are treated with an aqueous liquid.

Polyacrylic acid and various other water-soluble materials may be used to hold the warp cords in parallel relation before the fabric is dipped in an aqueous liquid. Such materials should be capable of being formed into threads which have sufficient tensile strength to hold the warp cords in parallel relation and which may be woven in the conventional manner to form tire cord fabric. Such threads preferably have a tensile strength of at least about ½ gram per denier at temperatures up to 150° F., and superior results are obtained where the soluble threads have a tensile strength of about one or more grams per denier.

In order to treat large amounts of fabric rapidly in a continuous operation, it is preferable to treat the fabric while it is in motion, for example in an apparatus of the type shown in Figs. 1 and 2. To permit such operation, the weft thread should be capable of completely dissolving in water maintained at a temperature not in excess of about 150° F. in less than one minute. The weft thread preferably dissolves in such water in not more than about twenty seconds, and superior results are obtained when the threads dissolve in about one-half to ten seconds in pure water maintained at a temperature of about 60° to 110° F.

Weft threads of polyvinyl alcohol filament yarn are superior to other water-soluble weft threads for use in tire cord fabric because of their high tensile strength and excellent solubility in water at moderate temperatures. If desired, the polyvinyl alcohol threads may be treated prior to weaving with glycerine or other chemicals to accelerate dissolving of the weft threads in lower temperature water. By treating the polyvinyl alcohol filaments with glycerine it is possible to dissolve the weft threads in less than ten seconds in water maintained at a temperature of about 60° to 110° F. although such treatment may reduce the tensile strength up to about one-third.

Tests indicate that a 225-denier polyvinyl alcohol filament yarn has a breaking strength of about 600 to 625 grams per filament as compared to 200 to 225 grams per filament for average 225-denier cotton yarn of the type used for the weak-weft threads of conventional weak-weft tire cord fabric. When the 225-denier polyvinyl alcohol yarn is dipped in a ten percent aqueous solution of glycerine and dried, the breaking strength or ultimate tensile strength of the yarn is only about 375 to 400 grams per filament. However, tests show that the glycerine-treated yarn is more readily soluble in lower temperature water as indicated below.

| Water temperature degrees Fahrenheit | Time required to dissolve untreated 225-denier polyvinyl alcohol threads, seconds | Time required to dissolve 225-denier polyvinyl alcohol threads treated with glycerine, seconds |
|---|---|---|
| 70° F | 18 | 9 |
| 75° F | 12 | 5 |
| 80° F | 6 | 3 |
| 85° F | 4 | 2 |
| 100° F | 2 | 2 |
| 120° F | 1 | 1 |
| 140° F | 1 | 1 |

Where dip tanks containing an aqueous liquid are used to wet the warp cords and to dissolve the polyvinyl alcohol weft threads before the application of the latex adhesive, some of the dissolved polyvinyl alcohol may penetrate into the warp cords, and after drying the warp cords may contain a small residue of polyvinyl alcohol radially inwardly of the latex adhesive coating. Where the weft threads are treated with glyceride, the dried warp cords may contain a small amount of glycerine in addition to the polyvinyl alcohol. Tests show that dipping warp cords of nylon or the like in an aqueous solution consisting of 95% water and 5% polyvinyl alcohol or consisting of 90% water, 5% polyvinyl alcohol, and 5% glycerine before dipping the cords in a latex adhesive dispersion does not reduce adhesion of such cords to rubber in a vulcanized rubber article.

It will be apparent that the percentage of polyvinyl alcohol and/or glycerine in a dipping solution may be limited by replacing the solution periodically with fresh solution. Where the weft threads of polyvinyl alcohol or other water-soluble material are dissolved by passing the warp cords through a dip tank containing pure water, the purity of the water may be maintained by continually supplying fresh water to the tank to replace the solution containing the dissolved weft-thread material. In this way the percentage of polyvinyl alcohol, glycerine or other impurities contacting the warp cords may be limited to a few percent or even less than one-half percent if desired.

According to the method of the present invention, a weak-weft tire cord fabric having warp cords of Dacron, viscose rayon, nylon or the like held in parallel relation with weft threads of polyvinyl alcohol or the like is treated with an aqueous liquid which is not harmful to the warp cords for a sufficient period of time to dissolve completely the weft threads and to thoroughly wet the warp cords. The wet cords are then treated, while still wet, with an aqueous liquid containing in dispersion a suitable latex adhesive and dried by heating and/or hot-stretched to modify the molecular structure of the cords. The pretreating of the warp cords with the aqueous liquid frees the cords by dissolving the weft threads and prevents excessive penetration of the latex adhesive into the cords.

The aqueous liquid employed for dissolving the weft threads and wetting the warp cords may be 100% pure water or water containing various additives which do not harm the warp cords or render them less suitable for reinforcing rubber tires or other fabric reinforced rubber articles. Best results are usually obtained where such liquid is pure water or water which when applied to the warp cords and evaporated leaves substantially less than 0.5 percent residue by weight whereby the central portion of each dried cord radially inwardly of the latex adhesive coating is substantially free of foreign material which might reduce the flex life or tensile strength of the cord.

*Example I*

A latex adhesive is prepared using the following recipe:

| | Parts by weight |
|---|---|
| Butadiene | 75 |
| 2-vinyl pyridine | 10 |
| Styrene | 15 |
| Water | 180 |
| Soap | 5 |
| Potassium persulfate | 0.3 |
| Dodecyl mercaptan | 0.4 |

Polymerization is carried out to a high hydrocarbon conversion (from about 80 percent to 98 percent) and the resulting latices are diluted with distilled water to a solids content of 14 percent. Hydroquinone, in the amount of 0.1 part is added to the latex after the polymerization to prevent further polymerization or condensation during standing and during its subsequent use.

Single strands of viscose-rayon tire cords previously dipped in pure water and squeezed to remove the excess water are then dipped in the above described latices while held under slight tension and are then stretched on a wooden frame and dried in an air circulating oven at 140° C. The dipped and dried cords are then embedded between two layers of natural rubber and cured in a steam press. The resultant product is found to have an excellent adhesive bond, and an extremely large force is required to pull the cords from between the rubber layers.

Example II

A latex is prepared using the same general recipe and procedure as in Example I but with the addition of resorcinol and formaldehyde. Nylon fibers are also dipped, dried, and stored by the same procedure used in Example I, and the polymerization is again carried out to a hydrocarbon conversion of at least 80 percent. Adhesion of the dipped nylon cords to natural rubber, GR–S, and neoprene is separately tested, and it is found that, in general, the addition of resorcinol and formaldehyde to the terpolymer latices serves the same beneficial purpose in about the same degree as the addition of the same materials to 2-vinyl pyridine copolymer latices. However, such additions are not particularly valuable when adhering either nylon or viscose rayon fibers to GR–S rubber.

The recipe used is as follows:

| | Parts by weight |
|---|---|
| Butadiene | 75 |
| 2-vinyl pyridine | 10 |
| Styrene | 15 |
| Resorcinol | 25 |
| Formaldehyde | 5 |
| Water | 180 |
| Soap | 5 |
| Potassium persulfate | 0.3 |
| Dodecyl mercaptan | 0.4 |

Example III

A latex adhesive is prepared using the following recipe:

| | Parts by weight |
|---|---|
| Butadiene | 75 |
| 2-vinyl pyridine | 10 |
| Styrene | 15 |
| Resorcinol | 25 |
| Formaldehyde | 5 |
| Distilled water | 180 |
| Potassium fatty acid soap | 5 |
| Potassium persulfate | 0.3 |
| Urea [1] | 2.5 |
| Dodecyl mercaptan | 0.4 |

[1] The urea is used to minimize loss of stability of latex due to freeze-thaw cycles.

A hydrocarbon conversion of 82 to 96 percent is obtained during polymerization and the resulting latices are diluted with distilled water to a solids content of 14 percent. Hydroquinone in the amount of 0.1 part is added to the latex after the polymerization. The resulting latex adhesive is then placed in the dip tank 8 of the oven shown in Figs. 1 and 2.

A weak-weft nylon fabric web containing 840/2 denier polyhexamethylene adipamide cords (two 840 denier plies twisted together twelve to thirteen times to the inch) are passed through pure distilled water in the dip tank 4 to thoroughly wet the cords. The web is then passed through the squeeze rolls 6 to the second dip tank 8 containing said latex adhesive and the excess water is removed by the squeeze rolls 10. The nylon web is then passed through the oven, the heating zones thereof being maintained at a fixed temperature of 425° F. The nylon cords are passed at a fixed speed through the heating zones of the oven while under a tension of 5.5 pounds per cord or sufficient to stretch them about 14 to 18 percent and the cords are heated for 18 seconds. This is sufficient time to evaporate all the water in each of the cords and to heat the cords to a high temperature. The cords are then immediately cooled with air at substantially atmospheric temperature to reduce the temperature of the cords below 150° F. before the tension is released.

The dried warp cords are found to increase in weight less than 4 percent due to the pickup of adhesive.

The fabric web is then used on a tire building machine in the manufacture of a pneumatic rubber tire according to the methods well understood in the art. Tires having carcasses reinforced by such a fabric web are strong, have exceptional durability at high speeds, and have improved fatigue resistance.

Example IV

A weak-weft nylon fabric web with a uniform width of about five feet containing up to about two thousand 840/2 denier polyhexamethylene adipamide warp cords held in parallel relation by 225-denier polyvinyl alcohol weft threads is passed through a first dip tank containing pure water maintained at a temperature of about 120° F. and each portion thereof is submerged in the water for about one second or so to dissolve completely the weft threads and to thoroughly wet the warp cords with water. The resulting weftless fabric is then passed between a pair of squeeze rolls to remove the excess water and then through a second dip tank containing in aqueous dispersion a latex adhesive as prepared in Example I whereby the wet nylon warp cords are provided with a thin surface coating of latex adhesive. Upon leaving the second dip tank, the weftless fabric is passed through squeeze rolls to remove excess dip solids and liquids, is hot stretched and cooled, and is used to make a high quality pneumatic rubber tire as in Example III. The resulting tire is strong, has improved resistance to compression-extension fatigue.

Example V

A 225-denier polyvinyl alcohol thread is dipped throughout its length in a ten percent aqueous solution of glycerine and dried. Thereafter such thread is woven with 840/2 denier polyhexamethylene adipamide tire cords to provide a weak-weft nylon fabric web as in Example IV having water-soluble weft threads and water-insoluble nylon warp cords. The fabric web is passed through a first dip tank containing pure water maintained at a temperature of about 80° F. and each portion thereof is submerged in the water for about three seconds or so to dissolve the glycerine-treated polyvinyl alcohol weft threads completely. The resulting weftless fabric is then treated and employed to build a high-quality pneumatic rubber tire in the same manner as in Example IV. The resulting tire has substantially the same characteristics as the tire of Example IV and is superior to tires made from latex-dipped nylon cords which are not predipped in water and which contain an amount by weight of latex adhesive more than about six or seven percent of the weight of the cords. Since the dried warp cords forming the weftless fabric of this example are substantially the same as those of Example IV before calendering and incorporation in a vulcanized rubber tire, tires made in the manner described in this example will perform substantially the same as those made as in Example IV.

It will be apparent that the water-dip process of the present invention is applicable to any fiber cord that is to be dipped in latex adhesive prior to incorporation in a reinforced rubber article and that any suitable adhesive may be used. In place of "Gen-Tac" one might employ, for example, a resorcinol-formaldehyde-latex adhesive prepared by mixing 40 parts of latex, 56 parts of water, 4 parts of resorcinol, and 2 parts of a strong base (10% NaOH). Regardless of the type of latex adhesive used, the water applied to the cords in the first dip tank will reduce the penetration of the adhesive applied in the second dip tank and thereby reduce brittleness and stiffness of the cords.

It is to be understood that; in accordance with the provisions of the patent statutes, variations and modifications of the specific articles and methods disclosed herein may be made without departing from the spirit of the invention.

Having described my invention, I claim:

A method of treating a fiber cord fabric having water soluble nylon warp cords and pick threads of polyvinyl alcohol comprising applying to the fabric for a period of about ½ to 20 seconds substantially pure water to dissolve said threads and to free said cords from said threads, said threads being treated with glycerine so as to be soluble in pure water at a temperature of about 60° to 110° F. in a period of time not in excess of about 10 seconds, applying a rubber-compatible latex adhesive to the cords while they are wet with said water, and drying said cords.

References Cited in the file of this patent

UNITED STATES PATENTS

| | | |
|---|---|---|
| 1,277,695 | Cavanaugh | Sept. 3, 1918 |
| 2,147,736 | Dreyfus | Feb. 21, 1939 |
| 2,291,616 | Fletcher | Aug. 4, 1942 |
| 2,336,267 | Lester | Dec. 7, 1943 |
| 2,419,922 | Tippetts | Apr. 29, 1947 |
| 2,431,977 | Alderfer | Dec. 2, 1947 |
| 2,645,266 | Muller | July 14, 1953 |

FOREIGN PATENTS

| | | |
|---|---|---|
| 682,182 | Great Britain | Nov. 5, 1952 |